July 16, 1940.  P. WASSERMAN  2,207,882
POWER TRANSMITTING DEVICE
Filed May 26, 1938   3 Sheets-Sheet 1
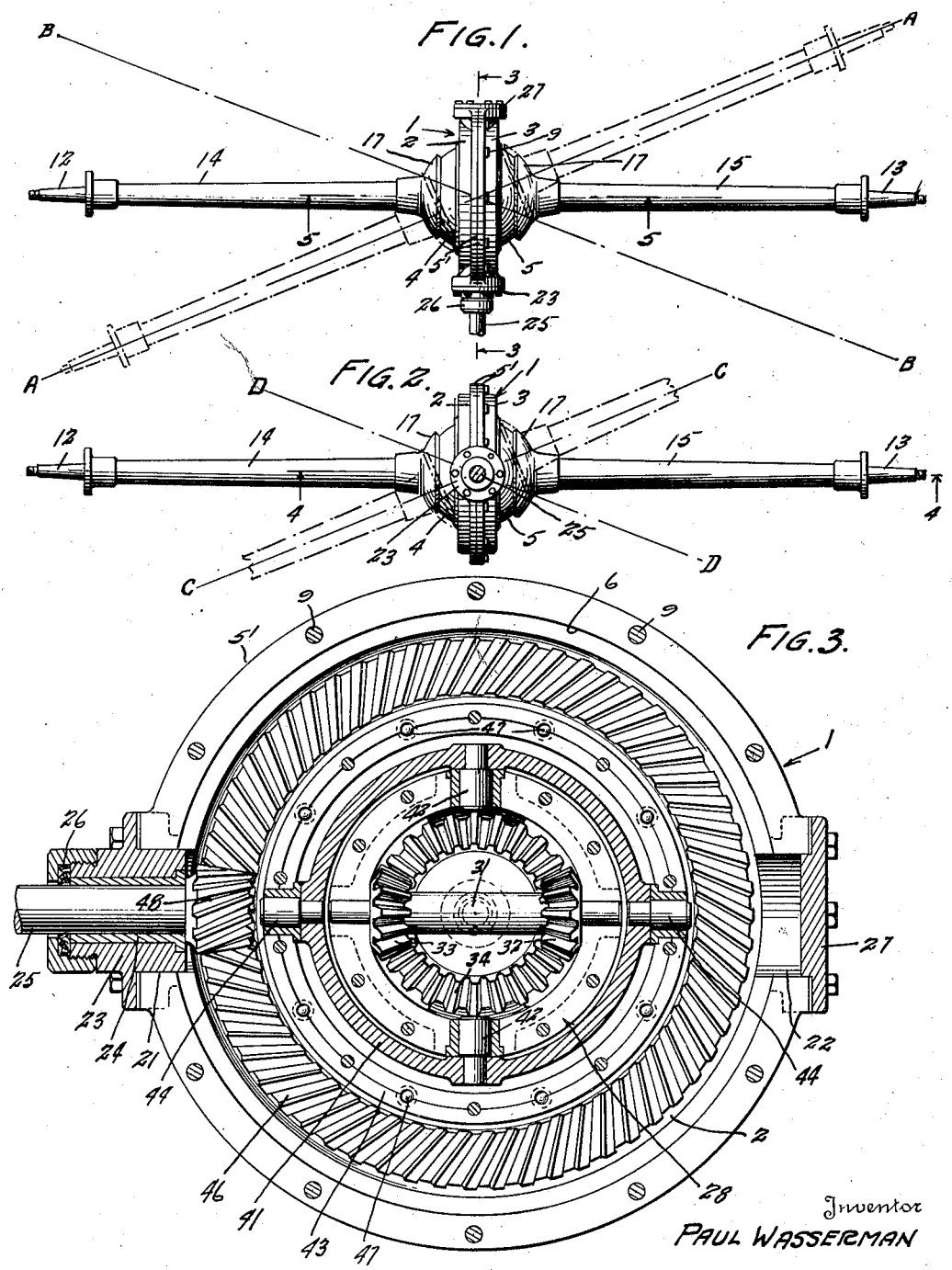
Inventor
PAUL WASSERMAN
By Semmes, Keegin & Semmes
Attorneys Inventor
PAUL WASSERMAN By Semmes, Keegin + Semmes
Attorneys July 16, 1940.  P. WASSERMAN  2,207,882
POWER TRANSMITTING DEVICE
Filed May 26, 1938  3 Sheets-Sheet 3

Inventor
PAUL WASSERMAN
By Semmes, Keegin & Semmes
Attorneys

Patented July 16, 1940

2,207,882

UNITED STATES PATENT OFFICE 2,207,882

POWER TRANSMITTING DEVICE

Paul Wasserman, New Castle, Pa.

Application May 26, 1938, Serial No. 210,256

2 Claims. (Cl. 74—311)

This invention relates to power transmitting devices, and more particularly to a differential power transmission device which is so constructed that the driven shafts may change their angular relation in respect to the drive shaft both in the horizontal as well as the vertical plane.

In the differential power transmissions now in use, a limited movement in the vertical plane of the driven shafts with respect to the drive shaft is possible. At present no differential power transmission device has been developed in which a substantial movement of the driven shafts in the vertical plane with respect to the drive shaft can be accomplished, and no provision has been made for such movement in the horizontal plane.

The type of differential used at present in automobile construction is an illustration of the limitations of the power transmissions now in use. In these differentials horizontal movement of the drive shaft is impossible, and only a slight vertical movement is possible by providing one or more universal joints in the drive shaft.

One of the objects of my invention is to overcome the above-mentioned and other limitations of the prior art.

Still another object of my invention is to provide a differential power transmission device which is so constructed that the angular relation of the driven shafts with respect to the drive shaft, both in the horizontal and vertical plane, may be freely changed.

A further object of my invention is to provide a differential power transmission device by the use of which a horizontal movement with respect to the drive shaft may be imparted to the driven shafts of a power driven vehicle, thereby providing means for steering the vehicle by changing the angle of the driven wheels in respect to the chassis.

A further object of my invention is to provide a differential power transmission device having a power take-off by means of which power may be transmitted for auxiliary use.

With these and other objects in view, my invention embraces the concept of providing a differential, the angular position of the housing of which may be fixed with relation to the drive shaft. The differential housing contains a gimbal construction which supports a differential gear case. The differential case forms the inner ring of the gimbal and is pivoted to an intermediate ring which is in turn pivoted to an outer ring. This outer ring carries a bevel ring gear which is driven by a bevel pinion attached to the end of the drive shaft. The driven shaft housings are movably mounted on the outer housing of the differential.

The angular position of the driven shafts with respect to the differential gear must necessarily be fixed due to the mechanical structure of such gearing. However, my construction permits of universal movement of the differential gear with respect to its driving media and a consequent angular displacement of the driven shafts.

In the drawings:

Figure 1 is a plan view of the rear axle incorporating my differential gear.

Figure 2 is a side elevation of the rear axle incorporating my differential gear.

Figure 3 is a view taken along line 3—3 of Figure 1 looking in the direction of the arrows.

Figure 4:
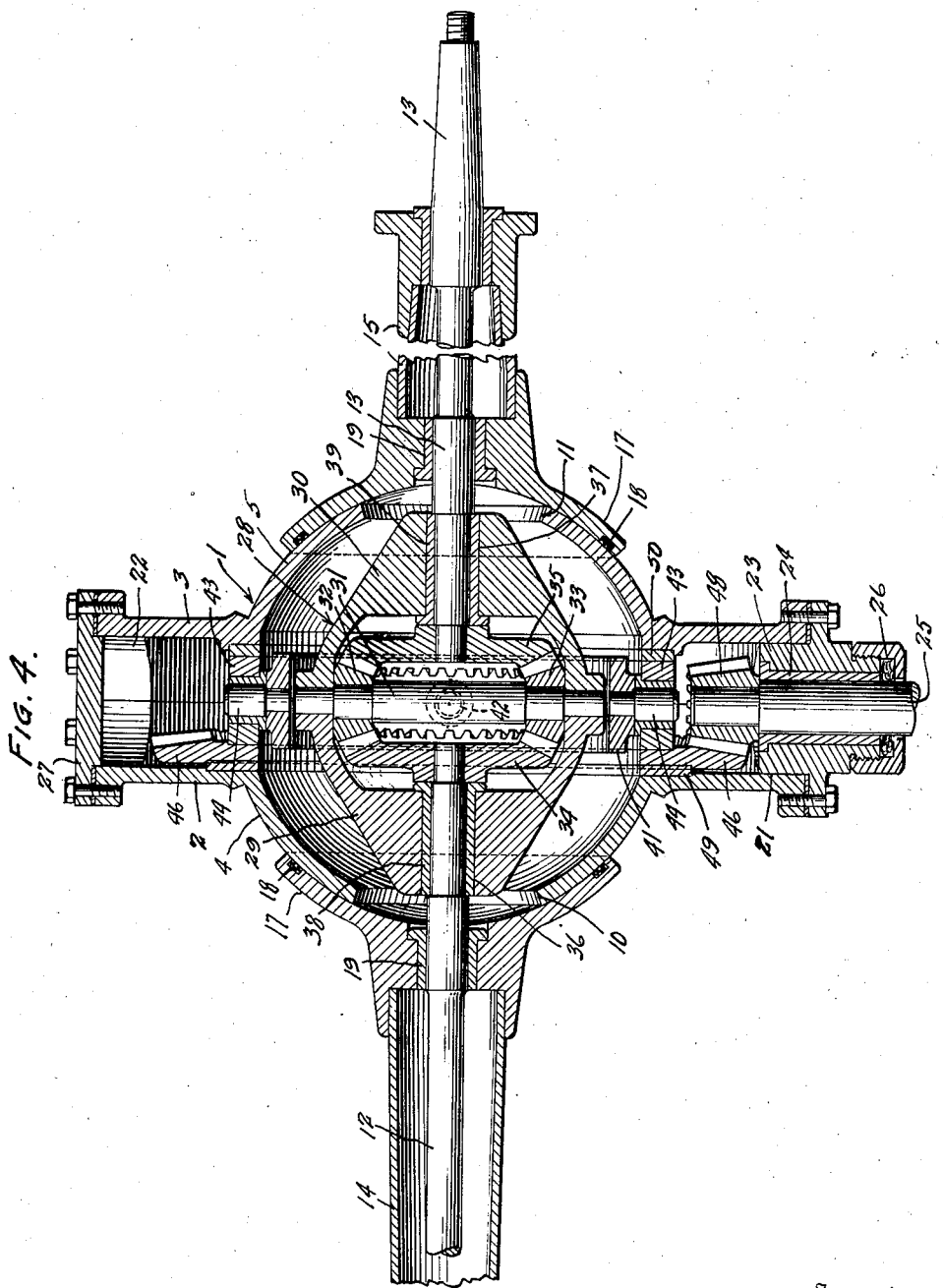
Figure 4 is a view taken along line 4—4 of Figure 2 looking in the direction of the arrows.

As shown in the drawings, my invention comprises a housing, generally designated by the numeral 1, which is composed of two similar sections 2 and 3, the side walls of which carry hemispherical portions 4 and 5. Each section 2 and 3 of the housing is provided with a peripheral flange 5' by means of which they may be rigidly fastened together. To maintain these two sections in proper alignment, the section 2 is provided with an annular recess 6 in which is adapted to fit a spigot 7 formed on the section 3. A gasket 8 is provided between the two flanges 5', and suitable bolts 9 are employed to form the two sections 2 and 3 into a rigid oil tight unit.

Figure 5:
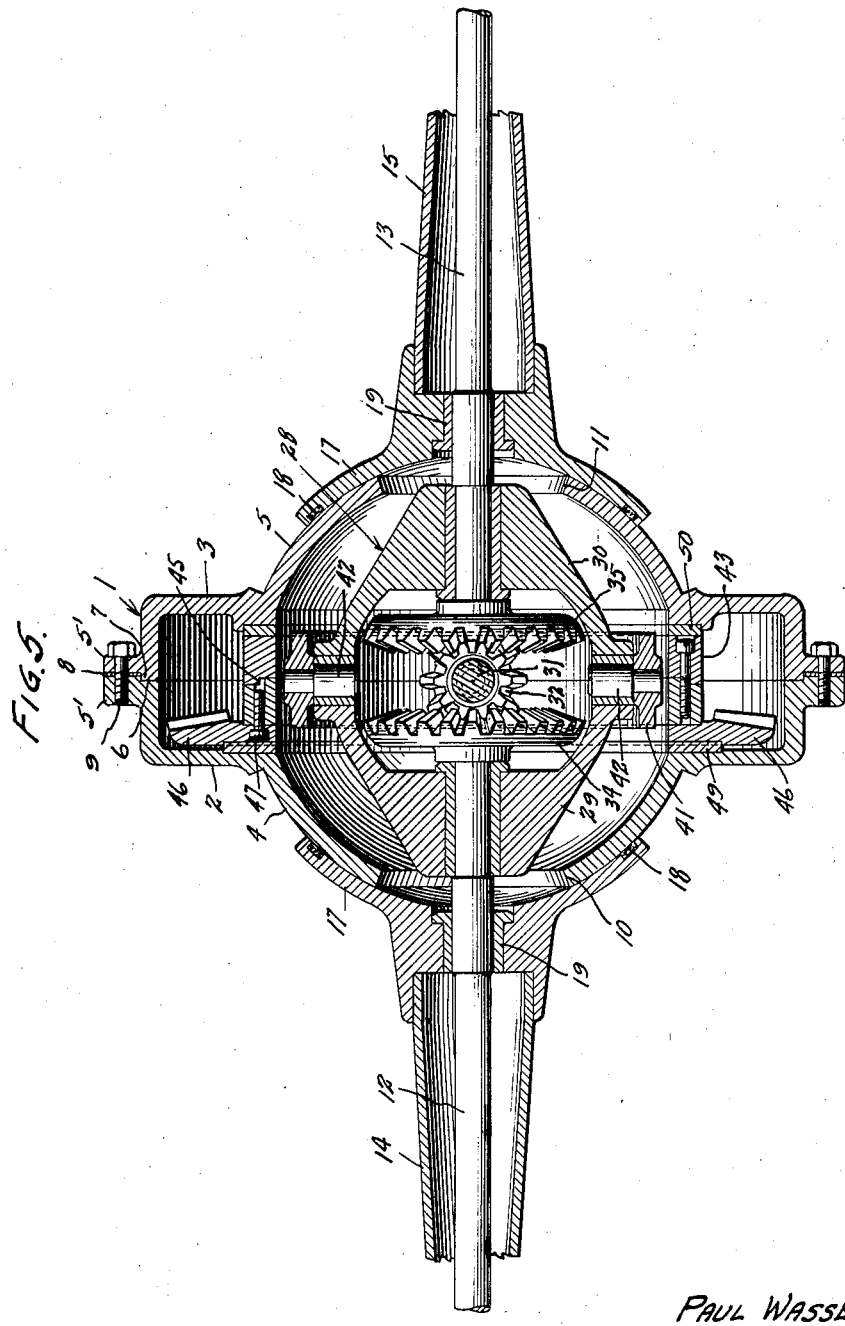
Figure 5 is a view taken along line 5—5 of Figure 1 looking in the direction of the arrows.

The hemispherical portions 4 and 5 contain apertures 10 and 11, respectively, through which may pass driven shafts 12 and 13. The apertures 10 and 11 are of such size to permit angular movement of the shafts 12 and 13 in them. The driven shafts 12 and 13 are surrounded by axle housings 14 and 15, respectively. As shown in Fig. 5, each of the axle housings 14 and 15 terminate in cupped flanges 17 each of which carries an oil ring 18 near its outer extremity. The cupped flanges 17 are so shaped as to closely abut the hemispherical portions 4 and 5 of the differential housing 1. Each flange 17 is provided with a recessed bearing 19 in which is journaled the driven shaft. The driven shafts may be attached to the driving wheels of a power driven vehicle, such as an automobile, by any suitable means.

As best shown in Figures 3 and 4, the differential housing 1 is provided with a pair of diametrically opposed apertures 21 and 22. The aperture 21 is provided with a bearing box 23 fitted with a suitable bearing 24 in which is journaled a drive shaft 25. A packing gland 26 is provided to prevent leakage of oil at this point. In the present application the aperture 22 is shown closed by a plate 27, but a similar structure to that shown in aperture 21 to permit a power take-off for auxiliary purposes may be provided.

Carried within the differential housing 1 is a differential gear case, designated generally by the numeral 28, which is composed of two similar sections 29 and 30. This gear case 28 carries a shaft 31 on which is mounted a pair of differential pinions 32 and 33 which mesh with a pair of bevel side gears 34 and 35. These bevel side gears 34 and 35 are rigidly attached to the ends of the driven shafts 12 and 13, respectively. The gear case 28 is also formed with diametrically opposed apertures 36 and 37 which are provided with bearings 38 and 39, respectively, in each of which is journaled one of the driven shafts 12 and 13.

The differential case 28 is pivotally mounted in an intermediate gimbal ring 41 by means of diametrically opposed pins 42. The intermediate ring 41 is in turn pivotally mounted in an outer ring 43 by means of diametrically opposed pins 44 which are offset at an angle of 90° from the first-mentioned pins 42. This construction permits the gear case 28 to have a universal movement.

The outer ring 43 is circumferentially split, as shown in Figure 5, so that it may easily be assembled or taken down for purposes of repair. The two portions of this outer ring 43 are shouldered to form an aligning fit, as shown at 45. This outer ring 43 carries a bevel ring gear 46 to which it is attached by any suitable means, such as shown at 47.

The bevel ring gear 46 is driven by a bevel pinion gear 48 which is attached to the drive shaft 25. The ring 43 and its gear 46 are adapted to rotate between bearing rings 49 and 50 fixed within the housing 1.

In operation, power is transmitted by means of the drive shaft 25 and the bevel pinion gear 48 to the bevel ring gear 46 which is forced to rotate about its axis. As the bevel ring gear 46 is rigidly mounted on the outer ring 43, this rotation causes a corresponding movement of the outer ring 43 which in turn causes the intermediate gimbal ring 41 and therefore the gear case 28 to revolve.

This movement of the gear case 28 in turn causes a rotation of the bevel gears 34 and 35 which are rigidly attached to the ends of the driven shafts 12 and 13, respectively. However, differential movement may be imparted to the side gears 34 and 35 and to the driven shafts 12 and 13 due to the fact that the pinions 32 and 33 are rotatably mounted on the shaft 31. The differential gear case, however, being mounted for universal movement with respect to its driving means, will permit an angular displacement of the driven shafts 12 and 13 in both vertical and horizontal planes without affecting the position of the drive shaft.

This construction may be advantageously used in connection with many types of industrial machinery wherever it is desired to vary the angular relationship between the driven and the drive shafts without the use of a series of universal joints. While this construction may be advantageously used in many types of machinery, its use in connection with automotive vehicles will be pointed out for purposes of illustration. In this connection, it should be noted that, if a power transmission of the type described is used to transmit power to the driven wheels of a long wheel base vehicle, a horizontal movement in respect to the drive shaft may be imparted to the driven shafts of the automobile, thereby providing means for steering by changing the angle of the driven wheels in respect to the chassis. Moreover, a power take-off may be used with this power transmission device and the power transmitted to the front axles of a trailer attached to the automobile. This construction will allow the wheels of the trailer to be driven by power furnished from the motor, and, if a differential of the type described in this application is also provided for the trailer, the axles of the trailer may be varied in respect to the power take-off shaft so as to enable the trailer to be steered by changing the angle of its driven wheels.

While for purposes of illustration there is disclosed one form of this invention and one means of adapting it for practical use, it is obvious that many variations can be made in the actual structure of the power transmission device and many adaptations can be conceived without departing from the broad concept of the invention.

For the above reasons it is to be understood that the invention is not to be limited to the exact construction disclosed, but the breadth of the invention is to be limited only by the prior art and the scope of the appended claims.

I claim:

1. A power transmission comprising, a fixed housing, a ring gear rotatable in said housing, a drive gear meshing with the said ring gear, a gear cage pivotally mounted in the ring gear for movement in the horizontal and vertical planes relative to the said ring gear, a pair of diametrically opposed axle housings each contoured for universal movable engagement with the said fixed housing, and a pair of axles each disposed in one of said axle housings and cooperating with the gear cage for taking off power from the gears in the gear cage.

2. A power transmission comprising, a fixed housing, a ring gear rotatable in said housing, a drive gear meshing with the said ring gear, a gear cage pivotally mounted in the ring gear for movement in the horizontal and vertical planes relative to the said ring gear, a pair of diametrically opposed axle housings each prvided at one end thereof with a partispherically shaped recessed portion for universal movable engagement with said fixed housing, and a pair of axles each disposed in one of the said axle housings and cooperating with the gear cage for taking off power from the gears in the gear cage.

PAUL WASSERMAN.